United States Patent
Li

(10) Patent No.: US 7,057,135 B2
(45) Date of Patent: Jun. 6, 2006

(54) METHOD OF PRECISE LASER NANOMACHINING WITH UV ULTRAFAST LASER PULSES

(75) Inventor: Ming Li, Chelmsford, MA (US)

(73) Assignee: Matsushita Electric Industrial, Co. Ltd., Osaka (JP)

( * ) Notice: Subject to any disclaimer, the term of this patent is extended or adjusted under 35 U.S.C. 154(b) by 97 days.

(21) Appl. No.: 10/793,543

(22) Filed: Mar. 4, 2004

(65) Prior Publication Data
US 2005/0194365 A1    Sep. 8, 2005

(51) Int. Cl.
*B23K 26/02* (2006.01)

(52) U.S. Cl. .................. 219/121.83; 219/121.67; 219/121.7

(58) Field of Classification Search ........... 219/121.83, 219/121.67, 121.68, 121.69, 121.7, 121.71, 219/121.85, 121.6
See application file for complete search history.

(56) References Cited

U.S. PATENT DOCUMENTS

| | | | |
|---|---|---|---|
| 6,552,301 B1 * | 4/2003 | Herman et al. | 219/121.71 |
| 6,574,250 B1 * | 6/2003 | Sun et al. | 372/25 |
| 2003/0201578 A1 * | 10/2003 | Li et al. | 264/400 |

OTHER PUBLICATIONS

C. Li et al., Micromachining with femtosecond 250nm laser pulses, Proceedings of SPIE vol. 4087, 2000, pp. 1194-1200.
Ming Li et al., Ultra-precision machining using fs fast Laser: An application for Photonic Crystal fabrication, Fs Ultramaching Workshop, Mar. 5, 2003, (53 pgs.)
Li, Ming et al: "Femtosecond Laser Micromachining of Si-on-SiO2 for Photonic Band Gap Crystal Fabrication", Japanese Journal of Applied Physics, Tokyo, Japan, vol. 40, No. 5A, Part 1, May 2001, pp. 3476-3477, XP001078634, ISSN: 0021-4922.
Li, Ming et al: "Nanostructuring in submicron-level waveguides with femtosecond laser pulses", Optics Communications, North-Holland Publishing Co, Amsterdam, NL, vol. 212, No. 1-3, Oct. 15, 2002, pp. 159-163, XP004386891, ISSN: 0030-4018.

* cited by examiner

*Primary Examiner*—M. Alexandra Elve
(74) *Attorney, Agent, or Firm*—RatnerPrestia

(57) ABSTRACT

A method for manufacturing a microstructure, which includes at least one feature having a dimension less than 200 nm, on a work piece. Pulses of UV laser light having a duration of less than about 1 ps and a peak wavelength of less than about 380 nm are generated. These pulses of UV laser light are focused to a substantially diffraction limited beam spot within a target area of the work piece. The fluence of this substantially diffraction limited beam spot in the target area of the work piece is controlled such that the diameter of the section of the target area machined by one of the pulses of UV laser light is less than 200 nm.

53 Claims, 3 Drawing Sheets

METHOD OF PRECISE LASER NANOMACHINING WITH UV ULTRAFAST LASER PULSES

FIELD OF THE INVENTION

The present invention concerns a method for micro- and nano-machining of features smaller than 200 nm on microstructures using UV ultrafast laser pulses. This method may also allow the laser machining of features smaller than 200 nm.

BACKGROUND OF THE INVENTION

As products get smaller and smaller, there is greater demand for micro-electrical-mechanical systems (MEMS), micro-optical devices and photonic crystals. With this demand, there is an associated increased interest in micro- and nano-machining. There are numerous possible applications for MEMS. As a breakthrough technology, allowing unparalleled synergy between previously unrelated fields such as biology and microelectronics, many new MEMS applications have emerged and many more may emerge in the near future, expanding beyond those currently identified or known. Additional applications in quantum electric devices, micro-optical devices and photonic crystals are also emerging.

Here are a few applications of current interest:

Quantum Electrical Devices

Interest in ideas such as quantum computing have lead to the development of devices requiring increasing smaller dimensions, such as cellular automata and coupled quantum dot technologies. Resonant tunneling devices such as resonant tunneling diodes, which may utilize quantum effects of transmission electrons to increase the efficiency of microwave circuits, require particularly fine features.

Micro-Optics

The application of micro-machining techniques to optics has lead to numerous advances in optical fabrication such as gray scale technology. Gray scale technology allows for the creation of a wide variety of shapes allowing for the best optical performance achievable. Traditional binary optics rely on a "stair step" shaped approximation of the ideal surface shape. Gray scale can actually create that ideal shape. Curves, ramps, torroids, or any other shape is possible. Multi-function optics, microlens arrays, diffusers, beam splitters, and laser diode correctors may all benefit from the use of gray scale technology. These optical devices as well as others, including fine pitch gratings for shorter and shorter wavelength light, benefit from increased precision available using micro-machining. Optical MEMS devices including beam shapers, continuous membrane deformable mirrors, moving mirrors for tunable lasers, and scanning two axis tilt mirrors have also emerged due to progress in micro-machining technology.

Photonic Crystals

Photonic crystals represent an artificial form of optical material that may be used to create optical devices with unique properties. Photonic crystals have many optical properties that are analogous to the electrical properties of semiconductor crystals and, thus, may also allow the development of optical circuitry similar to present electrical semiconductor circuitry. The feature sizes used to form photonic crystals and the precise alignment requirements of these features complicate manufacture of these materials. Improved alignment techniques and reduced minimum feature size capabilities for micro-machining systems may lead to further developments in this area.

Biotechnology

MEMS technology has enabling new discoveries in science and engineering such as: polymerase chain reaction (PCR) microsystems for DNA amplification and identification; micro-machined scanning tunneling microscope (STM) probe tips; biochips for detection of hazardous chemical and biological agents; and microsystems for high-throughput drug screening and selection.

Communications

In addition to advances that may result from the use of resonant tunneling devices, high frequency circuits may benefit considerably from the advent of RF-MEMS technology. Electrical components such as inductors and tunable capacitors made using MEMS technology may perform significantly better compared to present integrated circuit counterparts. With the integration of such components, the performance of communication circuits may be improved, while the total circuit area, power consumption and cost may be reduced. In addition, a MEMS mechanical switch, as developed by several research groups, may be a key component with huge potential in various microwave circuits. The demonstrated samples of MEMS mechanical switches have quality factors much higher than anything previously available. Reliability, precise tuning, and packaging of RF-MEMS components are to be critical issues that need to be solved before they receive wider acceptance by the market.

Advances in micro-optics and the introduction of new optical devices using photonic crystals may also benefit communications technology.

Accelerometers

MEMS accelerometers are quickly replacing conventional accelerometers for crash air-bag deployment systems in automobiles. The conventional approach uses several bulky accelerometers made of discrete components mounted in the front of the car with separate electronics near the air-bag. MEMS technology has made it possible to integrate the accelerometer and electronics onto a single silicon chip at $\frac{1}{5}$ to $\frac{1}{10}$ of the cost of the conventional approach. These MEMS accelerometers are much smaller, more functional, lighter, and more reliable as well, compared to the conventional macro-scale accelerometer elements.

Micro-Circuitry

Reducing the size of electronic circuits is another area in which MEMS technology may affect many fields. As the density of components and connections increases in these microcircuits, the processing tolerances decrease.

In some applications, such as photonic crystals or fiber Bragg gratings, in order to make fabricated device function, there are stringent requirements not only on feature sizes (<1000 nm in some cases), but also on positioning accuracy of these nano features (such as ~10 nm). Traditionally, both these feature size and positioning accuracy requirements have been difficult to meet with conventional laser micro-machining methods. Thus, the micromachining of submicron features has been a domain predominated by electron-beam, ultraviolet beam, and X-ray lithographic machines, as well as focused ion beam machines. These high-cost techniques usually require stringent environmental conditions, such as high vacuum or clean room condition. Standard lithographic methods require a separate operation for generating multiple masks.

If a beam processing technique is used, this process requires the beam to be directed accurately at the desired location with a high degree of precision for proper processing. Only four currently available technologies (laser direct writing, focused ion beam writing, micro electric discharge machine, and photochemical etching) have this potential capability. Other techniques (for example ion beam milling) are only desirable for flat wafer processing. However, direct laser writing has additional advantages including: (1) operation in ambient air under optical illumination; (2) the capability of forming structures inside transparent materials; and (3) low materials dependence. Direct laser writing may also be used to expose photoresist as part of a lithographic technique without the need to pregenerate mask sets.

Typically, ultrafast lasers in the visible (dye laser) or IR range (the fundamental wavelength of Ti:Sapphire or Nd:YLF) have been used for laser machining applications. It is known that the minimum spot size of a focused laser beam is approximately 2.44 times the f# of the objective lens, times the peak wavelength of the laser, i.e. the spot size is proportional to the peak wavelength. Thus, in system where a visible or an IR laser is used for nanomachining, the spot size is undesirably large for forming submicron features, even if high numerical aperture (low f#) optics are used. For example, if a Ti: Sapphire laser having an 800 nm peak wavelength and optics with an f# of 1 at 800 nm are used, the minimum size beam spot has a diameter of 1952 nm.

Even with this disadvantage, in late 1999 and early 2000, the capability of frequency doubled Ti: Sapphire femtosecond laser with a peak wavelength of 387 nm to machine ~200 nm air holes in plain Si-on-SiO$_2$ substrate was demonstrated. This submicron feature was achieved by controlling the fluence of the beam spot such that ablation only occurs near the intensity peak of the laser beam spot. However, this technique has a number of drawbacks for precise nanomachining, since the center of area actually machined may be somewhat offset from the center of the intensity profile. This uncertainty of the machining center may be induced by defects or imperfections of the material being processed, or may be due to slight pulse-to-pulse variations in the beam profile. Additionally, as the ratio of the machined area to the beam spot decrease, reducing any fluence fluctuations between pulses becomes increasingly critical.

UV lasers, having a peak wavelength <400 nm (mainly excimer lasers and frequency-converted YAG and YLF lasers), have been shown to provide superior surface finish compare to lasers in visible or IR range. In addition, since the minimum spot size is proportional to wavelength, UV lasers may be focused to a smaller spot size. Because most of these lasers have a pulse duration of >1 ns, they may cause undesirable heat effected zones to develop in the surrounding material during machining. Thus, these lasers may be undesirable for many nanomachining applications.

SUMMARY OF THE INVENTION

An exemplary embodiment of the present invention is an ultrafast laser micro-machining system for machining features smaller than 200 nm on a work piece. The ultrafast laser micro-machining system includes: an ultrafast laser source for generating pulses of UV laser light; a work piece holder for holding the work piece; an imaging system to image a target area of the held work piece; guiding optics for guiding the pulses of UV laser light along a beam path from the ultrafast laser source to the target area of the held work piece; a focusing mechanism to focus the pulses of UV laser light to a substantially diffraction limited beam spot within the target area; an alignment mechanism to provide fine alignment control of the substantially diffraction limited beam spot within the target area; and a fluence control means for controlling fluence of the substantially diffraction limited beam spot of the ultrafast laser micro-machining system in the target area of the held work piece. The pulses of UV laser light generated by the ultrafast laser source have a duration of less than about 1 ps and a peak wavelength of less than about 380 nm. The fluence control means controls the fluence of the substantially diffraction limited beam spot such that the diameter of the section of the target area machined by one of the pulses of UV laser light is less than 200 nm.

Another exemplary embodiment of the present invention is a method for manufacturing a microstructure, which includes at least one feature having a dimension less than 200 nm, on a work piece. Pulses of UV laser light having a duration of less than about 1 ps and a peak wavelength of less than about 380 nm are generated. These pulses of UV laser light are focused to a substantially diffraction limited beam spot within a target area of the work piece. The fluence of this substantially diffraction limited beam spot in the target area of the work piece is controlled such that the diameter of the section of the target area machined by one of the pulses of UV laser light is less than 200 nm.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures.

DETAILED DESCRIPTION OF THE INVENTION

Figure 1:
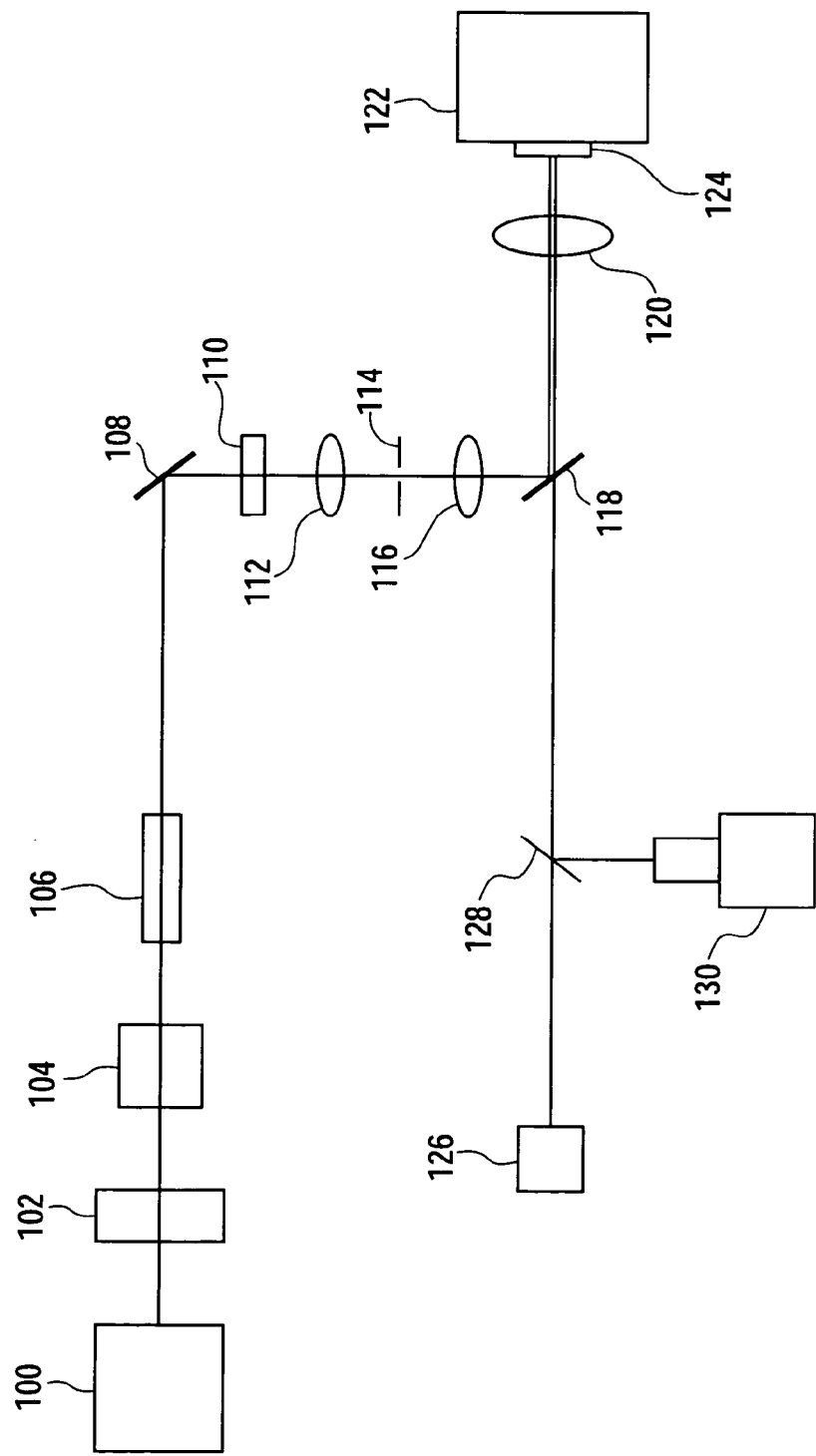
FIG. 1 is a block diagram of an exemplary laser micro-machining system according to the present invention.

FIG. 1 illustrates a simplified block diagram of an exemplary laser micro-machining system according to the present invention. This exemplary system includes: ultrafast laser oscillator 100; shutter 102; variable attenuator 104; harmonic generating crystal 106; dichroic mirrors 108 and 118; polarization control means 110; lenses 112, 116, and 120; mask 114; work piece holder 122; work piece illumination source 126; beam splitter 128; and digital camera 130. The optical beams in the exemplary system are shown as dotted lines.

In this exemplary system, ultrafast laser oscillator 100 may desirably include any type of solid state gain medium typically used for ultrafast laser machining applications, such as: Cr:YAG (peak fundamental wavelength, $\lambda_f$=1520 nm); Cr:Forsterite ($\lambda_f$=1230–1270 nm); Nd:YAG and Nd:YVO4 ($\lambda_f$=1064 nm); Nd:GdVO4 ($\lambda_f$=1063 nm); Nd:YLF ($\lambda_f$=1047 nm and 1053 nm); Nd:glass ($\lambda_f$=1047–1087 nm); Yb:YAG ($\lambda_f$=1030 nm); Cr:LiSAF ($\lambda_f$=826–876 nm); Ti:Sapphire ($\lambda_f$=760–820 nm); and Pr:YLF ($\lambda_f$=612 nm). These solid state gain media may be pumped using standard optical pumping systems such as erbium doped fiber lasers and diode lasers, the output pulses of which may be directly coupled into the solid state gain medium or may undergo harmonic generation before being used to pump the solid state gain medium. The solid state gain medium (media) may be configured to operate as one or more of: a laser oscillator; a single pass amplifier; and/or a multiple pass amplifier. This element also includes optics to substantially collimate the laser light. Ultrafast laser oscillator 100 desirably produces nearly Fourier-transform limited pulses having a duration of less than about 1 ps, typically less than 200 fs. An additional, non-solid state, single or multiple pass amplifier such as a XeCl, KrF, ArF, or $F_2$ excimer amplifier (not shown) may be included to increase the output power of ultrafast laser oscillator 100. Alternatively, ultrafast laser oscillator 100 may include an ultrafast excimer laser system (e.g. XeCl, $\lambda_f$=308 nm; KrF, $\lambda_f$=248 nm; ArF, $\lambda_f$=193 nm; or $F_2$, $\lambda_f$=157 nm) or an ultrafast dye laser system (e.g. 7-diethylamino-4-methylcoumarin, $\lambda_f$=435–500 nm; benzoic acid, 2-[6-(ethylamino)-3-(ethylimino)-2,7-dimethyl-3H-xanthen-9-yl]-ethyl ester, monohydrochloride, $\lambda_f$=555–625 nm; 4-dicyanmethylene-2-methyl-6-(p-dimethylaminostyryl)-4H-pyran, $\lambda_f$=598–710 nm; or 2-(6-(4-dimethylaminophenyl)-2,4-neopentylene-1,3,5-hexatrienyl)-3-methylbenzothiazolium perchlorate, $\lambda_f$=785–900 nm).

Shutter 102 is used to control the laser output (i.e. open during machining and closed to block the beam when not machining). This may extend the life of other components in the exemplary micromachining system.

Variable attenuator 104 desirably allows for fine control of the pulse energies, and thus the beam fluence. Variable attenuator 104 may be any type of controllable variable attenuator that may withstand the high peak powers associated with ultrafast lasers, for example a pair of linear polarizing members arranged on either side of a controllable polarization rotation element such as a Pockels cell, Kerr cell, or a liquid crystal. Alternatively, a fixed linear polarizing member and a rotatable polarization member may be used as variable attenuator 104. The resulting control of pulse energies is especially critical for machining features which are smaller than the minimum spot size that may be achieved for light of a particular wavelength. As noted above, the wavelength of light used by a laser micromachining system affects the minimum feature size that may machined with the system. In the case of an ultrafast micro-machining laser, it is possible to micro-machine fine features even smaller than the diffraction limited size of the beam spot.

Figure 3:
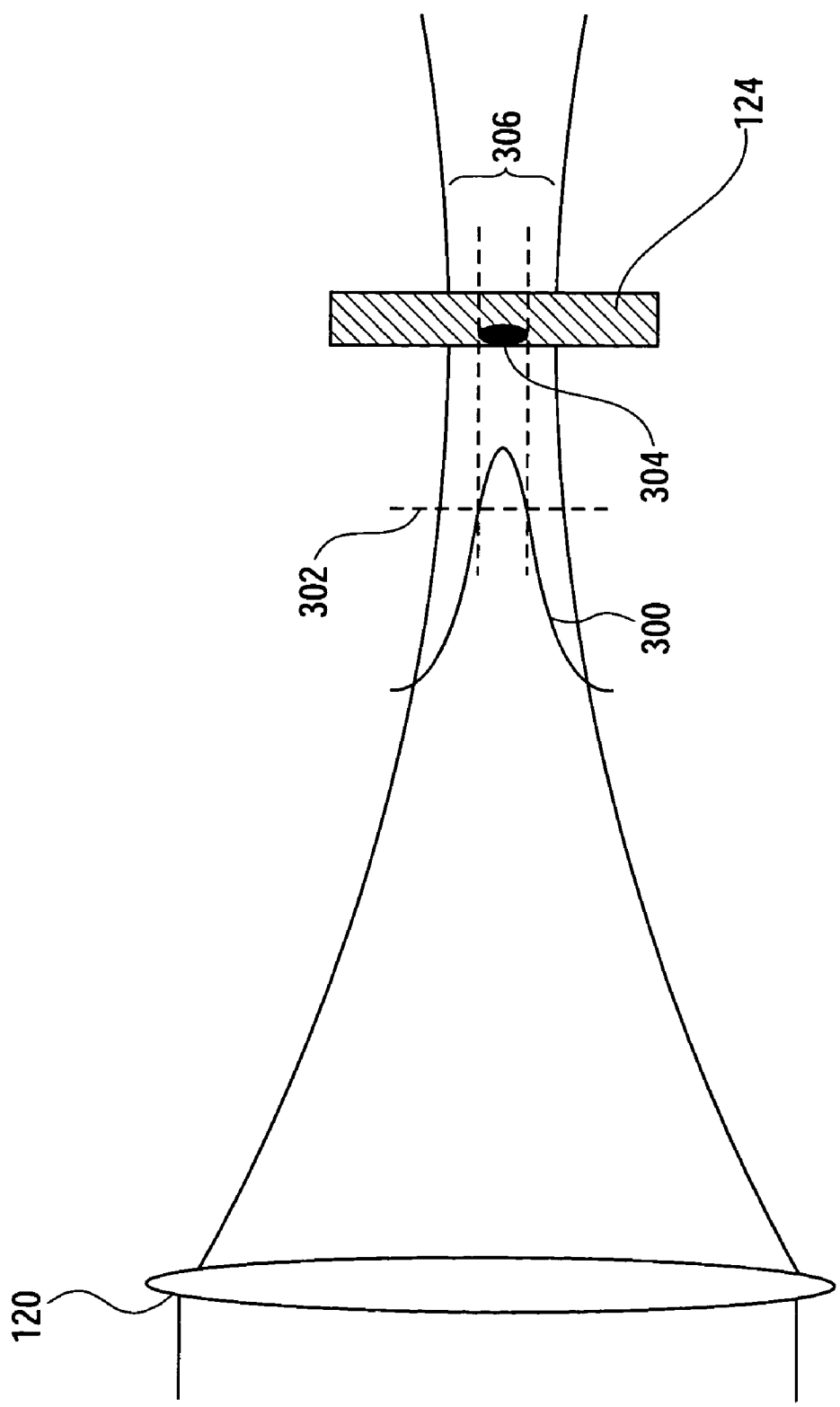
FIG. 3 a schematic representation of an exemplary laser beam of the exemplary laser micro-machining system of FIG. 1, illustrating a method of laser machining features smaller than the beam spot size.

FIG. 3 illustrates an exemplary method of laser machining such features. Accurate control of the fluence within the machining beam spot is very desirable in this method. In the exemplary illustration of FIG. 3, the laser beam is focused into diffraction limited beam spot 306 on the top surface of work piece 124 by lens 120 of the exemplary laser micromachining system. Gaussian curve 300 represents the radial fluence of the laser beam on the surface. Line 302 is an exemplary machining threshold of the device material. Depending on the peak fluence of the laser beam, line 302 may fall above, below, or exactly at the full width at half maximum (FWHM) of Gaussian curve 300. The horizontal lines extending from the intersections of Gaussian curve 300 and line 302 define area 304 on the surface of work piece 124. Therefore, area 304 is the only portion of the surface to be machined directly by the laser. Additional material may be machined due to conduction of thermal energy within the device material, but, in laser machining with ultrafast lasers, creation of such a heat affected zone in the material is minimized. Thus, by accurately controlling the peak fluence with variable attenuator 104, the size of area 304 may be carefully controlled, allowing the machining of fine features smaller that the diffraction limited spot size of the ultrafast laser.

As may be seen from FIG. 3, the smaller the desired diameter of area 304 relative to the diameter of diffraction limited-beam spot 306 becomes, the shallower the slope of the beam fluence profile at the machining threshold becomes. A shallower slope means that a small variation in the peak fluence of the beam spot between pulses may lead to an undesirably large uncertainty in machined area 304. Also, a machining in a portion of the beam spot in which Gaussian curve 300 has a shallow slope may increase the heat affected zone surrounding machined area 304. Ideally, the edges of machined area 304 may fall near the steepest portion of the slope of Gaussian curve 300, when the diameter of machined area 304 is approximately 0.72 of the FWHM of Gaussian curve 300. Thus, it is desirable to move toward the use of shorter wavelength ultrafast lasers for machining of smaller features.

The attenuated beam then enters harmonic generating crystal 106. This crystal may be designed to double, triple, or quadruple the fundamental frequency of the laser pulses generated by ultrafast laser oscillator 100 to produce ultrafast UV pulses, which may desirably have a peak wavelength shorter than about 380 nm and a duration of less than 1 ns and preferably less than 100 ps. The efficiency of harmonic generation in harmonic generating crystal 106 may vary with the thickness of the crystal. Also, the efficiency of harmonic generating crystal 106 may vary with the intensity of the fundamental light incident on the crystal and, thus, the selection of the desired attenuation of variable attenuator 104 desirably accounts for this variable as well. It is noted that harmonic generation crystals may desirably be optimized to provide desirable phase matching for a particular input fundamental wavelength and harmonic number. Therefore, although it may be possible to tune the peak wavelength of ultrafast laser oscillator 100 over a significant range, such tuning may not be desirable for harmonic generation.

Also, it is noted that for ultrafast laser pulses of less than 1 ns, as desired in the present invention, the Fourier-transform limited bandwidth of these pulses may be relatively broad. Harmonic generation using such broad bandwidth is complicated by the desired phase matching criteria between the fundamental and harmonic at the output side of harmonic generating crystal 106. One method to achieve the desired phase matching criteria for these relatively broad bandwidth pulses is to reduce the thickness of harmonic generating crystal 106, which may lower the efficiency of harmonic generation.

Desirably, both mirror 108 and mirror 118 are dichroic mirrors designed to have a high reflectivity (>95%) throughout the bandwidth of the UV pulses and high transmission (>99%) for shorter wavelengths, as well as desirably minimal absorption at the fundamental wavelength of ultrafast laser oscillator 100 and all of its harmonics that might be generated in harmonic generating crystal 106. These dichroic mirrors are desirably formed of a large number of dielectric layers, with thicknesses on the order of the peak wavelength of the UV pulses generated in harmonic generator 106. The broader the desired high reflectivity bandwidth of these dichroic mirrors, the more complex this layered dielectric structure becomes. Thus, it is desirable to substantially maintain the bandwidth of these pulses near their Fourier-transform limit.

This pair of dichroic mirrors, 108 and 118, allows steering of the UV laser beam and, also, helps to prevent any unwanted light that is emitted from harmonic generating crystal 106 at the fundamental wavelength, or lower harmonics than the desired harmonic of the UV pulses, from reaching the target area on work piece 124. Dichroic mirror 118 also desirably allows the visible light from work piece illumination source 126 to be efficiently transmitted for illuminating and imaging the work piece.

Polarization control means 110 desirably transforms the polarization of the UV laser pulses to circular polarization. The use of circularly polarized light and a round cross section beam spot has been found to produce the minimum sized machining areas, which may be consistently round, on work piece surfaces, or within the body of the work piece. Thus, circularly polarized light may be desirable to form the smallest and most reproducible features by laser machining. The UV pulses incident on polarization control means 110 may be linearly polarized, in which case polarization control means 110 is desirably a quarter wave plate optimized for the peak wavelength of the UV pulses. This is particularly likely if variable attenuator 104 is a polarization based attenuator. If the UV pulses incident on polarization control means 110 are not polarized already, polarization control means 110 may desirably include a linear polarizing member followed by a quarter wave plate. The bandwidth of the UV pulses may mean that not all of the wavelengths may be nearly circularly polarized by the quarter wave plate, but, for a nearly Fourier-transform limited pulse, the majority of the energy in the pulse should be at wavelengths close enough to the peak wavelength to ignore this effect.

The nearly circularly polarized UV pulses may be focused by lens 112 through a pinhole, or other shape, in mask 114 and then re-collimated by lens 116. Passing the laser beam though mask 104 in this manner may affect the beam shape of the laser micro-machining beam. Lenses 112 and 116 have desirably low absorptivity and low chromatic aberration within the bandwidth of the UV pulses.

The laser beam is then directed by dichroic mirror 116 into high f# lens 120 which focuses the beam onto a target area on the surface of work piece 124 that is held in place by work piece holder 122. It is noted that high f# lens 120 may be replaced by a UV microscope objective or several separate optical elements, although this last alternative may complicate alignment of the system. Whichever alternative is used the element also desirably has low absorptivity and low chromatic aberration within the bandwidth of the UV pulses. Desirably, the nearly circularly polarized UV pulses are focused on the surface of the work piece in a diffraction limited, or nearly diffraction limited, spot to allow machining of a minimum feature size.

Work piece holder 122 desirably includes a computer-controlled XYZ motion stage with micrometer resolution (for example, a micron resolution XYZ motion stage manufactured by Burleigh). A computer-controlled, piezo-electric XY motion stage with nanometer-resolution (for example, a piezo-electric XY motion stage manufactured by Queensgate) may also be included. Focusing of the UV laser pulses may be achieved by moving work piece 124 nearer to or farther from high f# lens 120 using the XYZ motion stage. These one or two computer-controlled motion stages of work piece holder 122 may be used to align the beam spot of the laser micro-machining system on the surface of work piece 114, with the micrometer resolution XYZ motion stage providing coarse positioning and the piezo-electric motion stage providing fine positioning.

Alternatively, a computer-controlled, piezo-electric XY motion stage with nanometer-resolution (not shown) coupled to mask 114 may be used for fine alignment of the beam spot of the laser micro-machining system on work piece 124. As noted, the machining beam spot size on the surface of work piece 124 is desirably diffraction limited. A pinhole in mask 114 may be desirably larger than this machining beam spot size. If the beam size at mask 114 is desirably larger than the pinhole, moving the pinhole within the focused laser beam, may allow the beam spot formed on the surface of work piece 124 to be moved by a scaled amount, thereby increasing the ultimate precision of the beam spot alignment. This scaling is based on the ratio of the pinhole size to the machining spot size, which may desirably be 10:1 or greater. With a 10:1 ratio and using a computer-controlled, piezo-electric XY motion stage with nanometer-resolution to move the mask, the positioning of the machining beam spot may be controlled with an improved precision.

To monitor the alignment of the laser micro-machining system and the progress of the processing, the surface of work piece 124 may be illuminated by work piece illumination source 126 and imaged by digital camera 130 (for example, a Roper Scientific digital camera, having a matrix of 1300×1030 pixels, with a pixel length and width of ~6.7 µm). The imaging light from the work piece illumination source may be substantially collimated by an included lens system (not separately shown) and passes through beam splitter 128 (possibly a half silvered mirror) and dichroic mirror 118, where it follows the path of the laser machining beam and is focused onto work piece 124 by lens 120. The imaging light is then reflected back through this lens. It passes back through dichroic mirror 118 and is reflected off beam splitter 128 into digital camera 130 to produce an image of the work piece surface. To reduce potential chromatic aberrations of this image, the imaging light desirably has a narrow spectrum. Thus, although it may be desirable for work piece illumination source 126 to be a light emitting diode or a diode laser, a filtered broad spectrum light source may be used as well. Although the use of dichroic mirror 118 to combine the machining beam and the imaging beam requires that these light beams have different wavelengths, it may be desirable for the two light sources to have similar wavelengths so that lens 120 may focus both beams similarly. Any difference between the focal lengths of the microscope objective at the illumination wavelength and the UV wavelength of the micro-machining laser may be compensated by the optics of digital camera 130 and/or additional optics between beam splitter 128 and digital camera 130 (not shown).

As described in published U.S. patent application US-2003-0201578-A1, METHOD OF DRILLING HOLES WITH PRECISION LASER MICROMACHINING, by M. Li et al., ultrafast laser micro machining systems are capable of machining features smaller that their diffraction limited spot size, which allows the machining of smaller features. The exemplary laser micromachining method described is this patent application may also have the advantage of allowing improved positioning accuracy of laser machined features by centering the machined area within the beam spot. As described above, to produce increasingly fine features on microstructures, it is also desirable to be able to align the beam spot of the micro-machining laser with increasing accuracy. It may also be desirable to identify and machine features, which may have submicron dimensions, on microstructures. Such operations may require an accuracy greater than the diffraction limited resolution of this exemplary imaging system of FIG. 1. Additionally, computer-controlled piezo-electric motion stages allow positioning accuracies, which exceed the diffraction limit of a visible light imaging system as shown in FIG. 1. Exemplary methods for machining features smaller that the diffraction limited spot size of the machining laser and for achieving positioning accuracies that exceed the diffraction limit of a visible light imaging system are described in U.S. patent application, ULTRAFAST LASER DIRECT WRITING METHOD FOR MODIFYING EXISTING MICROSTRUCTURES ON A SUBMICRON SCALE, by M. Li et al. filed on Mar. 1, 2004.

Alternatively, a scanning electron microscope (SEM) may be used to monitor beam spot alignment for laser machining of submicron features on existing microstructures, although this is a much more expensive solution, requiring a vacuum system. Also, SEM's may only image conductive materials or material coated with a conductive layer. An atomic force microscope (AFM) may also be used to monitor the alignment of a laser micro-machining system. Although highly accurate, an AFM may require significant scanning time to map the surface features for alignment. Even with their disadvantages over an optical imaging system, SEM and AFM alignment methods may be desirable for the micromachining of increasingly small features.

It may be understood by one skilled in the art that the order of several of the elements in the exemplary laser micro-machining system of FIG. 1 may be rearranged without altering the function of the system. For example: harmonic generating crystal 106 may be located before variable attenuator 104 and or shutter 102; variable attenuator 104 may be located before shutter 102; polarization control means 110 may be located before dichroic mirror 108; and shutter 102 may be located anywhere along the beam path of the machining laser beam from its present position to immediately before high f# lens 120.

Figure 2:
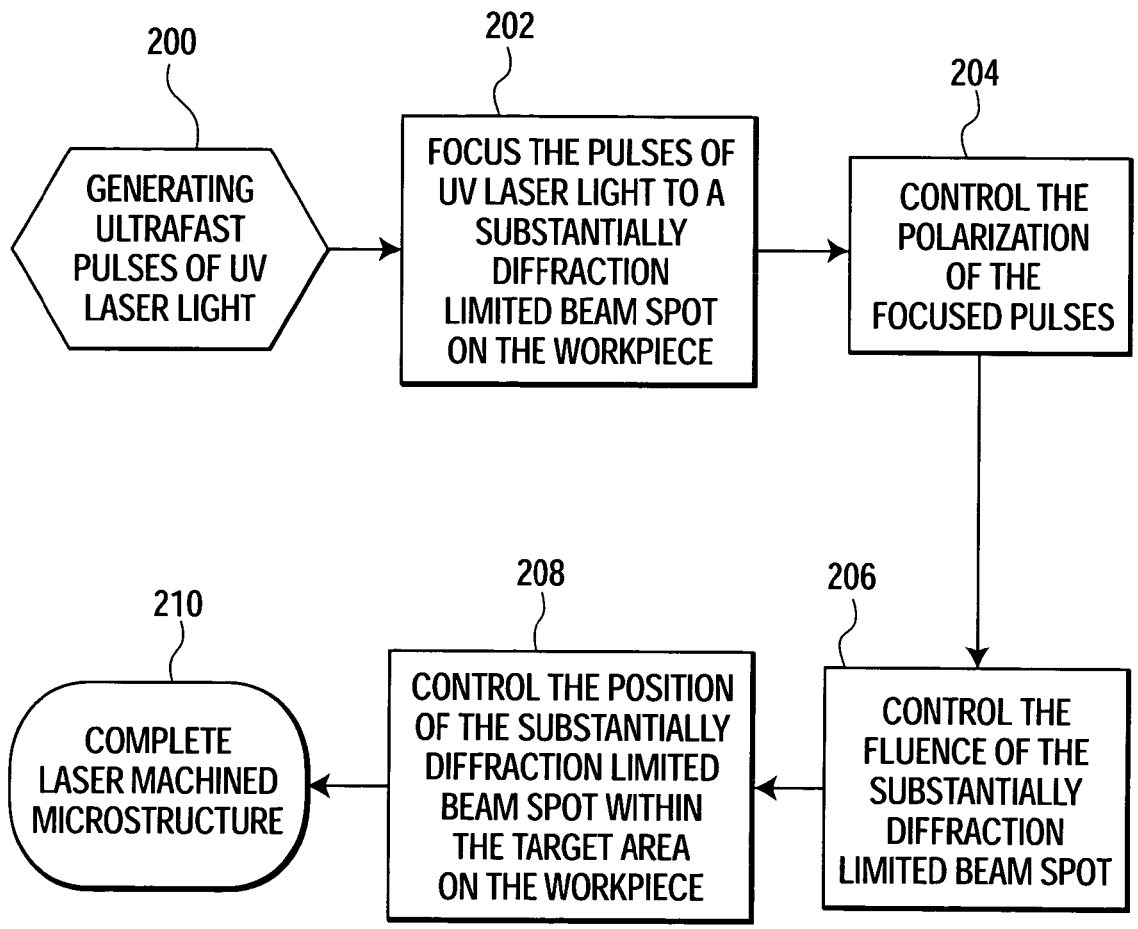
FIG. 2 is a flow chart illustrating an exemplary method of machining features smaller than 200 nm using the exemplary laser micro-machining system of FIG. 1.

The exemplary laser micro-machining system of FIG. 1 may be operated to allow laser machining of submicron features on pre-existing microstructures as well for manufacturing new microstructures. The mass customization of microstructures and the repair of defective microstructures may also be accomplished using this exemplary system. FIG. 2 is a flowchart illustrating an exemplary method of laser machining features smaller than about 200 nm using ultrafast UV laser pulses, according to the present invention. This exemplary method may be performed using a laser micro-machining system similar to the exemplary system of FIG. 1.

The exemplary method of FIG. 2 may be used to form a variety of different microstructures in which features smaller than about 200 nm may be desirable, such as: microstructure molds; a quantum cellular automata; coupled quantum dot devices; resonant tunneling devices; multifunction optical arrays; diffractive optical elements; beam shapers; microlens arrays; optical diffusers; beam splitters; laser diode correctors; fine pitch gratings; photonic crystals; micro-electrical-mechanical systems; micro-circuitry; micro-surface-acoustic-wave devices; micro-mechanical oscillators; polymerase chain reaction microsystems; biochips for detection of hazardous chemical and biological agents; and high-throughput drug screening and selection microsystems.

Ultrafast pulses of UV laser light having a duration of less than about 1 ps and a peak wavelength of less than about 380 nm are generated, step 200. These pulses may be generated as harmonics of the fundamental wavelength of a number of ultrafast laser systems. For example, a Ti:Sapphire ultrafast laser may be used to generate initial pulses of laser light having a peak wavelength in the range of 760–820 nm. At the lower end of this range, the pulses from a Ti:Sapphire ultrafast laser may be frequency doubled to generate second harmonic pulses of UV laser light, which have a peak of approximately 380 nm. Ti:Sapphire pulses may also be frequency tripled to generate third harmonic pulses of UV laser light ($\lambda_f$=253 nm-274 nm) and frequency quadrupled to generate fourth harmonic pulses of UV laser light ($\lambda_f$=190 nm-205 nm).

Pr:YLF ultrafast lasers ($\lambda_f$=612 nm) may also be used to generate the initial pulses of laser light and frequency doubled to a peak wavelength of approximately 306 nm, frequency tripled to a peak wavelength of approximately 204 nm, or frequency quadrupled to a peak wavelength of approximately 153 nm.

Nd:YAG and Nd:YVO4 ultrafast lasers ($\lambda_f$=1064 nm) may be frequency tripled or quadrupled to generate ultrafast UV pulses having peak wavelengths of approximately 355 nm or 266 nm, respectively. Nd:GdVO4 ultrafast lasers ($\lambda_f$=1063 nm) may also be frequency tripled or quadrupled to generate ultrafast UV pulses having peak wavelengths of approximately 354 nm or 266 nm, respectively. Nd:YLF has two peak fundamental wavelengths that may be used 1047 nm and 1053 nm. The 1047 nm peak fundamental wavelength may be frequency tripled or quadrupled to generate ultrafast UV pulses having peak wavelengths of approximately 349 nm or 262 nm, respectively, and the 1053 nm peak fundamental wavelength may be frequency tripled or quadrupled to generate ultrafast UV pulses having peak wavelengths of approximately 351 nm or 263 nm, respectively. Nd:glass ultrafast lasers are tunable over an about 40 nm range encompassing the fundamental wavelengths of the other ultrafast Nd laser systems ($\lambda_f$=1047–1087 nm). Thus, Nd:glass ultrafast lasers, may be frequency tripled to generate ultrafast UV pulses having peak wavelengths in the range of 349 nm to 362 nm, or frequency quadrupled to generate ultrafast UV pulses having peak wavelengths in the range of 262 nm to 272 nm.

Yb:YAG ultrafast lasers ($\lambda_f$=1030 nm) may be frequency tripled or quadrupled to generate ultrafast UV pulses having peak wavelengths of approximately 343 nm or 258 nm, respectively.

Cr:LiSAF ultrafast lasers are tunable over an about 50 nm range ($\lambda_f$=826–876 nm). Thus, Cr:LiSAF ultrafast lasers may be frequency tripled to generate ultrafast UV pulses having peak wavelengths in the range of 275 nm to 292 nm, or frequency quadrupled to generate ultrafast UV pulses having peak wavelengths in the range of 206 nm to 219 nm. Cr:YAG ultrafast lasers ($\lambda_f$=1520 nm) may be frequency quadrupled to generate the pulses of UV laser light having a peak wavelength of approximately 380 nm and Cr:Forsterite ultrafast laser ($\lambda_f$=1230–1270 nm) may be frequency quadrupled to generate the pulses of UV laser light having a peak wavelength in the range of 307 nm to 318 nm.

XeCl ultrafast excimer lasers may be used to generate ultrafast UV pulses having peak wavelengths of approximately 308 nm. This fundamental wavelength may be frequency doubled or tripled to generate ultrafast UV pulses having peak wavelengths of approximately 154 nm or 103 nm, respectively. KrF ultrafast excimer lasers may be used to generate ultrafast UV pulses having peak wavelengths of approximately 248 nm. This fundamental wavelength may be frequency doubled to generate ultrafast UV pulses having peak wavelengths of approximately 124 nm. ArF ultrafast excimer lasers may be used to generate ultrafast UV pulses having peak wavelengths of approximately 193 nm. $F_2$ ultrafast excimer lasers may be used to generate ultrafast UV pulses having peak wavelengths of approximately 157 nm.

2-(6-(4-dimethylaminophenyl)-2,4-neopentylene-1,3,5-hexatrienyl)-3-methylbenzothiazolium perchlorate ultrafast dye lasers are tunable over an about 115 nm range ($\lambda_f$=785–900 nm). Thus, 2-(6-(4-dimethylaminophenyl)-2,4-neopentylene-1,3,5-hexatrienyl)-3-methylbenzothiazolium perchlorate ultrafast dye lasers may be frequency tripled to generate ultrafast UV pulses having peak wavelengths in the range of 262 nm to 300 nm, or frequency quadrupled to generate ultrafast UV pulses having peak wavelengths in the range of 198 nm to 225 nm. 4-dicyanmethylene-2-methyl-6-(p-dimethylaminostyryl)-4H-pyran ultrafast dye lasers are tunable over an about 112 nm range ($\lambda_f$=598–710 nm). Thus, 4-dicyanmethylene-2-methyl-6-(p-dimethylaminostyryl)-4H-pyran ultrafast dye lasers may be frequency doubled to generate ultrafast UV pulses having peak wavelengths in the range of 299 nm to 355 nm, frequency tripled to generate ultrafast UV pulses having peak wavelengths in the range of 199 nm to 237 nm, or frequency quadrupled to generate ultrafast UV pulses having peak wavelengths in the range of 149 nm to 178 nm. Benzoic acid, 2-[6-(ethylamino)-3-(ethylimino)-2,7-dimethyl-3H-xanthen-9-yl]-ethyl ester, monohydrochloride ultrafast dye lasers are tunable over an about 70 nm range ($\lambda_f$=555–625 nm). Thus, benzoic acid, 2-[6-(ethylamino)-3-(ethylimino)-2,7-dimethyl-3H-xanthen-9-yl]-ethyl ester, monohydrochloride ultrafast dye lasers may be frequency doubled to generate ultrafast UV pulses having peak wavelengths in the range of 277 nm to 313 nm, frequency tripled to generate ultrafast UV pulses having peak wavelengths in the range of 185 nm to 208 nm, or frequency quadrupled to generate ultrafast UV pulses having peak wavelengths in the range of 139 nm to 156 nm. 7-diethylamino-4-methylcoumarin ultrafast dye lasers are tunable over an about 65 nm range ($\lambda_f$=435–500 nm). Thus, 7-diethylamino-4-methylcoumarin ultrafast dye lasers may be frequency doubled to generate ultrafast UV pulses having peak wavelengths in the range of 217 nm to 250 nm, frequency tripled to generate ultrafast UV pulses having peak wavelengths in the range of 145 nm to 167 nm, or frequency quadrupled to generate ultrafast UV pulses having peak wavelengths in the range of 109 nm to 125 nm.

The pulses of UV laser light generated by one of the systems in step 200 are focused to a substantially diffraction limited beam spot within a target area of the work piece, step 202. This may be desirably accomplished using a high f# lens or microscope objective, as described above with reference to FIG. 1. The polarization of the focused pulses of UV laser light incident on the target area of the work piece is controlled, step 204, to be substantially constant from one pulse to the next. Desirably, the polarization is control such that wavelengths near the peak wavelength of the focused pulses of UV laser light, which desirable include a substantial portion of the energy of the pulse are circularly polarized.

The fluence of the substantially diffraction limited beam spot in the target area of the work piece is controlled such that the diameter of the section of the target area machined by each pulse of UV laser light is less than 200 nm, step 206. It is noted that machining the material of the work piece in step 206 may include either ablating the material (i.e. altering the shape and/or size of the submicron feature) or permanently altering the structure of the material within the machined section. Examples of permanently altering the structure of this material include: changing the index of refraction of the material; altering the lattice structure of a crystalline material, potentially forming an amorphous region within the crystal structure; and changing the chemical structure of the material. It is noted that while ablation of the work piece material desirably occurs on the surface of the work piece, permanent alterations of the internal material structure may be performed within a relatively transparent work piece material, as well as alterations of the material structure on the surface.

It is also noted that, desirably, the use of shorter wavelength UV light and high f# focusing optics result in the edges of the machined section of the target area being in a portion of the substantially diffraction limited beam spot where the beam intensity profile has a relatively steep slope, as described above with reference to FIG. 3.

The position of the substantially diffraction limited beam spot within the target area may be desirably controlled, step 208, as described above with reference to the exemplary system of FIG. 1, to form features more complicated than a single machined spot. This positioning may be desirably accomplished with an accuracy of less than about 100 nm, depending on the monitoring and alignment systems used. Once all of the desired microstructure has been machined using the ultrafast UV pulses of laser light, the laser machined microstructure is complete, step 210.

In a demonstration of the exemplary method of FIG. 2 a Ti:Sapphire ultrafast laser oscillator was used and 150 fs long, frequency tripled, 258 nm peak wavelength UV laser pulses were generated. These UV laser pulses were used to form an exemplary one dimensional (1D) photonic crystal in an approximately 571 nm wide waveguide. The exemplary 1D photonic crystal had a minimum pitch between air hole centers of approximately 410 nm and air hole diameters of approximately 200 nm which were positioned along the waveguide with an approximately 8 nm accuracy.

The exemplary embodiments of the present invention involve combining the features of ultrafast laser processing and UV laser processing together for high precision nanomachining. Reduction of the minimum feature size and improved machining resolution may be achieved through use of these exemplary embodiments. For example, if the minimum feature size for microstructures formed using a 258 nm peak wavelength (Ti:Sapphire third harmonic, for example) ultrafast laser micromachining system are 100 nm, the minimum feature size using a similar 387 nm peak wavelength (Ti:Sapphire second harmonic, for example) ultrafast laser micromachining system is 160 nm, and the minimum feature size using a similar 775 nm peak wavelength (Ti:Sapphire fundamental, for example) ultrafast laser micromachining system is 300 nm.

The present invention includes a number of exemplary systems and methods to machine features smaller than approximately 200 nm, using a laser micro-machining system. Such techniques may help to expand the areas of use for laser micro-machining. Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An ultrafast laser micro-machining system for machining features smaller than 200 nm on a work piece, the ultrafast laser micro-machining system comprising:

an ultrafast laser source for generating pulses of UV laser light having a duration of less than about 1 ps and a peak wavelength of less than about 380 nm;

a work place holder for holding the work piece;

an imaging system to image a target area of the held work piece;

guiding optics for guiding the pulses of UV laser light along a beam path from the ultrafast laser source to the target area of the held work piece;

a focusing mechanism to focus the pulses of UV laser light to a substantially diffraction limited beam spot within the target area, the beam spot having a radial fluence variation;

an alignment mechanism to provide fine alignment control of the substantially diffraction limited beam spot within the target area; and a fluence control means for controlling fluence of the substantially diffraction limited beam spot of the ultrafast laser micro-machining system in the target area of the held work piece such that a diameter of a section of the target area machined by one of the pulses of UV laser light is less than 200 nm, and edges of the section of the target area are proximate to a portion of the beam spot having a steepest slope of the radial fluence variation.

2. The ultrafast laser micro-machining system according to claim 1, wherein the focusing mechanism and the polarization control optics control the substantially diffraction limited beam spot such that the substantially diffraction limited beam spot has a substantially Gaussian intensity profile and a full width at half maximum (FWHM) greater than or equal to 200 nm.

3. The ultrafast laser micro-machining system according to claim 1, further comprising polarization control optics in the beam path to control a polarization of the focused pulses of UV laser light incident on the target area of the held work piece.

4. The ultrafast laser micro-machining system according to claim 1, wherein the ultrafast laser source includes one of:

a frequency quadrupled, Cr:YAG ultrafast laser or a frequency doubled, Ti:Sapphire ultrafast laser, the peak wavelength being approximately 380 nm;

a frequency tripled, Nd:YAG or Nd:YVO$_4$ ultrafast laser, the peak wavelength being approximately 355 nm;

a frequency tripled, Nd:GdVO$_4$ ultrafast laser, the peak wavelength being approximately 354 nm;

a frequency tripled, Nd:YLF ultrafast laser, the peak wavelength being approximately 349 nm or approximately 352 nm;

a frequency tripled, Nd:glass ultrafast laser, the peak wavelength being in the range of 349 nm to 362 nm;

a XeCl ultrafast excimer laser, the peak wavelength being approximately 308 nm;

a frequency quadrupled, Cr: Forsterite ultrafast laser, the peak wavelength being in the range of 307 nm to 318 nm;

a frequency doubled, Pr:YLF ultrafast laser, the peak wavelength being approximately 306 nm;

a frequency doubled, 4-dicyanmethylene-2-methyl-6-(p-dimethylaminostyryl)-4H-pyran ultrafast dye laser, the peak wavelength being in the range of 299 nm to 355 nm;

a frequency doubled, benzoic Acid, 2-[6-(ethylamino)-3-(ethylimino)-2,7-dimethyl-3H-xanthen-9-yl]-ethyl ester, monohydrochloride ultrafast dye laser, the peak wavelength being in the range of 277 nm to 313 nm;

a frequency tripled, Cr: LiSAF ultrafast laser, the peak wavelength being in the range of 275 nm to 292 nm;

a frequency quadrupled, Nd:YAG, Nd:YVO$_4$, or Nd:GdVO$_4$ ultrafast laser, the peak wavelength being approximately 266 nm;

a frequency quadrupled, Nd:YLF ultrafast laser, the peak wavelength being approximately 262 nm or approximately 263 nm;

a frequency tripled, 2-(6-(4-dimethylaminophenyl)-2,4-neopentylene-1,3,5-hexatrienyl)-3-methylbenzothiazolium perchlorate ultrafast dye laser, the peak wavelength being in the range of 262 nm to 300 nm;

a frequency quadrupled, Nd:glass ultrafast laser, the peak wavelength being in the range of 262 nm to 272 nm;

a frequency quadrupled, Yb:YAG ultrafast laser, the peak wavelength being approximately 258 nm;

a frequency tripled, Ti:Sapphire ultrafast laser, the peak wavelength being in the range of 253 nm to 274 nm;

a KrF ultrafast excimer laser, the peak wavelength being approximately 248 m;

a frequency doubled, 7-diethylamino-4-methylcoumarin ultrafast dye laser, the peak wavelength being in the range of 217 nm to 250 nm;

a frequency quadrupled, Cr:LiSAF ultrafast laser, the peak wavelength being in the range of 206 nm to 219 nm;

a frequency tripled, Pr:YLF ultrafast laser, the peak wavelength being approximately 204 nm;

a frequency tripled, 4-dicyanmethylene-2-methyl-6-(p-dimethylaminostyryl)-4H-pyran ultrafast dye laser, the peak wavelength being in the range of 199 nm to 237 nm;

a frequency quadrupled 2-(6-(4-dimethylaminophenyl)-2,4-neopentylene-1,3,5-hexatrienyl)-3-methylbenzothiazolium perchlorate ultrafast dye laser, the peak wavelength being in the range of 196 nm to 225 nm;

an ArF ultrafast excimer laser, the peak wavelength being approximately 193 nm;

a frequency quadrupled, Ti:Sapphire ultrafast laser, the peak wavelength being in the range of 190 nm to 205 nm;

a frequency tripled, benzoic Acid, 2-[6-(ethylamino)-3-(ethylimino)-2,7-dimethyl-3H-xanthen-9-yl]-ethyl ester, monohydrochloride ultrafast dye laser, the peak wavelength being in the range of 185 nm to 208 nm;

an F$_2$ ultrafast excimer laser, the peak wavelength being approximately 157 nm;

a frequency doubled, XeCl ultrafast excimer laser, the peak wavelength being approximately 154 nm;

a frequency quadrupled, Pr:YLF ultrafast laser, the peak wavelength being approximately 153 nm;

a frequency quadrupled 4-dicyanmethylene-2-methyl-6-(p-dimethylaminostyryl)-4H-pyran ultrafast dye laser, the peak wavelength being in the range of 149 nm to 178 nm;

a frequency tripled, 7-diethylamino-4-methylcoumarin ultrafast dye laser, the peak wavelength being in the range of 145 nm to 167 nm;

a frequency quadrupled, benzoic Acid, 2-(6-(ethylamino)-3-(ethylimino)-2,7-dimethyl-3H-xanthen-9-yl)-ethyl ester, monohydrochloride ultrafast dye laser, the peak wavelength being in the range of 139 nm to 156 nm;

a frequency doubled, KrF ultrafast excimer laser, the peak wavelength being approximately 124 nm;

a frequency quadrupled, 7-diethylamino-4-methylcoumarin ultrafast dye laser, the peak wavelength being in the range of 109 nm to 125 nm; or a frequency tripled, XeCl ultrafast excimer laser, the peak wavelength being approximately 103 nm.

5. The ultrafast laser micro-machining system according to claim 1, wherein the imaging system includes one of:
an optical imaging system, including an illumination source for producing illumination light and a digital camera to image the target area of the work piece;
a scanning electron microscope; or
an atomic force microscope.

6. The ultrafast laser micro-machining system according to claim 1, wherein the focusing mechanism includes a micrometer resolution XYZ motion stage coupled to the work piece holder.

7. The ultrafast laser micromachining system according to claim 1, wherein the alignment mechanism includes:
a transversely moveable pinhole mask having a pinhole located in the beam path; and
a nanometer resolution, piezo-electric XY motion stage coupled to the transversely moveable pinhole mask.

8. The ultrafast laser micro-machining system according to claim 1, wherein the alignment mechanism includes a nanometer resolution, piezo-electric XY motion stage coupled to the work piece holder.

9. The ultrafast laser micro-machining system according to claim 1, wherein the fluence control means includes a variable attenuator in the beam path.

10. A method for manufacturing a microstructure, which includes at least one feature having a dimension less than 200 nm, on a work piece, the method comprising the steps of:
a) generating pulses of UV laser light having a duration of less than about 1ps and a peak wavelength of less than about 380 nm;
b) focusing the pulses of UV laser light to a substantially diffraction limited beam spot within a target area of the work piece, such that the beam spot has a radial fluence variation; and
c) controlling fluence of the substantially diffraction limited beam spot in the target area of the work piece such that the diameter of a section of the target area machined by one of the pulses of UV laser light is less than 200 nm, and edges of the section of the target area are proximate to a portion of the beam spot having a steepest slope of the radial fluence variation.

11. The method according to claim 10, wherein step (b) includes focusing the pulses of UV laser light such that a full width at half maximum of the substantially diffraction limited beam spot within the target area of the work piece is greater than the diameter of the section of the target area machined by one of the pulses of UV laser light.

12. The method according to claim 10, further comprising the step of:
d) controlling a position of the substantially diffraction limited beam spot within the target area with an accuracy of less than about 100 nm.

13. The method according to claim 12, wherein:
the pulses of UV laser light propagate along a beam path including a transversely moveable pinhole mask having a pinhole located in the beam path;
step (b) includes focusing the pulses of UV laser light such that a beam spot diameter of the substantially diffraction limited beam spot within the target area of the work piece is smaller than a pinhole diameter of the pinhole; and
step (d) includes controlling a position of the substantially diffraction limited beam spot within the target area by moving the transversely moveable pinhole mask a scaled amount based on a ratio of the pinhole diameter to the beam spot diameter.

14. The method according to claim 12, wherein step (d) includes controlling a position of the substantially diffraction limited beam spot within the target area of the work piece by moving the work piece.

15. The method according to claim 10, further comprising the step of:
d) controlling a polarization of the focused pulses of UV laser light incident on the target area of the work piece.

16. The method according to claim 10, wherein the microstructure is at least one of a microstructure mold, a quantum cellular automaton, a coupled quantum dot device, a resonant tunneling device, a multifunction optical array, a diffractive optical element, a beam shaper, a microlens array, an optical diffuser, a beam splitter, a laser diode corrector, a fine pitch grating, a photonic crystal, a micro-electrical-mechanical system, micro-circuitry, a micro-surface-acoustic-wave device, a micro-mechanical oscillator, a polymerase chain reaction microsystem, a biochip for detection of hazardous chemical and biological agents, or a high-throughput drug screening and selection microsystem.

17. The method according to claim 10, wherein step (a) includes the steps of:
a1) using a XeCl ultrafast excimer laser to generate the pulses of UV laser light having the duration of less than about 1 ps and the peak wavelength of the pulses of UV laser light being approximately 308 nm.

18. The method according to claim 10, wherein step (a) includes the steps of:
a1) using a KrF ultrafast excimer laser to generate the pulses of UV laser light having the duration of less than about 1 ps and the peak wavelength of the pulses of UV laser light being approximately 248 nm.

19. The method according to claim 10, wherein step (a) includes the steps of:
a1) using an KrF ultrafast excimer laser to generate the pulses of UV laser light having the duration of less than about 1 ps and the peak wavelength of the pulses of UV laser light being approximately 193 nm.

20. The method according to claim 10, wherein step (a) includes the steps of:
a1) using an $F_2$ ultrafast excimer laser to generate the pulses of UV laser light having the duration of less than about 1 ps and the peak wavelength of the pulses of UV laser light being approximately 157 nm.

21. The method according to claim 10, wherein step (a) includes the steps of:
a1) using a Ti:Sapphire ultrafast laser to generate initial pulses of laser light having the duration of less than about 1 ps; and
a2) doubling a frequency of the laser light in the initial pulses to generate the pulses of UV laser light, the peak wavelength of the pulses of UV laser light being approximately 380 nm.

22. The method according to claim 10, wherein step (a) includes the steps of:
a1) using a Pr:YLF ultrafast laser to generate initial pulses of laser light having the duration of less than about 1 ps; and
a2) doubling a frequency of the laser light in the initial pulses to generate the pulses of UV laser light, the peak wavelength of the pulses of UV laser light being approximately 306 nm.

23. The method according to claim 10, wherein step (a) includes the steps of:

a1) using a 4-dicyanmethylene-2-methyl-6-(dimethylaminostyryl)-4H-pyran ultrafast dye laser to generate initial pulses of laser light having the duration of less than about 1 ps; and a2) doubling a frequency of the laser light in the initial pulses to generate the pulses of UV laser light, the peak wavelength of the pulses of UV laser light being in the range of 299 nm to 355 nm.

24. The method according to claim 10, wherein step (a) includes the steps of:

a1) using a benzoic Acid, 2-[6-ethylamino)-3-(ethylimino)-2,7-dimethyl-3H-xanthen-9-yl]ethyl ester, monohydrochloride ultrafast dye laser to generate initial pulses of laser light having the duration of less than about 1 ps; and a2) doubling a frequency of the laser light in the initial pulses to generate the pulses of UV laser light, the peak wavelength of the pulses of UV laser light being in the range of 277 nm to 313 nm.

25. The method according to claim 10, wherein step (a) includes the steps of:

a1) using a 7-diethylamino-4-methylcoumarin ultrafast dye laser to generate initial pulses of laser light having the duration of less than about 1 ps; and a2) doubling a frequency of the laser light in the initial pulses to generate the pulses of UV laser light, the peak wavelength of the pulses of UV laser light being in the range of 217 nm to 250 nm.

26. The method according to claim 10, wherein step (a) includes the steps of:

a1) using a XeCl ultrafast excimer laser to generate initial pulses of laser light having the duration of less than about 1 ps; and a2) doubling a frequency of the laser light in the initial pulses to generate the pulses of UV laser light, the peak wavelength of the pulses of UV laser light being approximately 154 nm.

27. The method according to claim 10, wherein step (a) includes the steps of:

a1) using a KrF ultrafast excimer laser to generate initial pulses of laser light having the duration of less than about 1 ps; and a2) doubling a frequency of the laser light in the initial pulses to generate the pulses of UV laser light, the peak wavelength of the pulses of UV laser light being approximately 124 nm.

28. The method according to claim 10, wherein step (a) includes the steps of:

a1) using a Nd:YAG or Nd:YVO$_4$ ultrafast laser to generate initial pulses of laser light having the duration of less than about 1 ps; and a2) tripling a frequency of the laser light in the initial pulses to generate the pulses of UV laser light, the peak wavelength of the pulses of UV laser light being approximately 355 nm.

29. The method according to claim 10, wherein step (a) includes the steps of:

a1) using a Nd:GdVO$_4$ ultrafast laser to generate initial pulses of laser light having the duration of less than about 1 ps; and a2) tripling a frequency of the laser light in the initial pulses to generate the pulses of UV laser light, the peak wavelength of the pulses of UV laser light being approximately 354 nm.

30. The method according to claim 10, wherein step (a) includes the steps of:

a1) using a Nd:glass ultrafast laser to generate initial pulses of laser light having the duration of less than about 1 ps; and a2) tripling a frequency of the laser light in the initial pulses to generate the pulses of UV laser light, the peak wavelength of the pulses of UV laser light being in the range of 349 nm to 362 nm.

31. The method according to claim 10, wherein step (a) includes the steps of:

a1) using a Nd:YLF ultrafast laser to generate initial pulses of laser light having the duration of less than about 1 ps; and a2) tripling a frequency of the laser light in the initial pulses to generate the pulses of UV laser light, the peak wavelength of the pulses of UV laser light being approximately 349 nm or approximately 351 nm.

32. The method according to claim 10, wherein step (a) includes the steps of:

a1) using a Yb:YAG ultrafast laser to generate initial pulses of laser light having the duration of less than about 1 ps; and a2) tripling a frequency of the laser light in the initial pulses to generate the pulses of UV laser light, the peak wavelength of the pulses of UV laser light being approximately 343 nm.

33. The method according to claim 10, wherein step (a) includes the steps of:

a1) using a Cr:LiSAF ultrafast laser to generate initial pulses of laser light having the duration of less than about 1 ps; and a2) tripling a frequency of the laser light in the initial pulses to generate the pulses of UV laser light, the peak wavelength of the pulses of UV laser light being in the range of 275 nm to 292 nm.

34. The method according to claim 10, wherein step (a) includes the steps of:

a1) using a 2-(6-(4-dimethylaminophenyl)-2,4-neopentylene-1,3,5-hexatrienyl)-3-methylbenzothiazolium perchlorate ultrafast dye laser to generate initial pulses of laser light having the duration of less than about 1 ps; and a2) tripling a frequency of the laser light in the initial pulses to generate the pulses of UV laser light, the peak wavelength of the pulses of UV laser light being in the range of 262 nm to 300 nm.

35. The method according to claim 10, wherein step (a) includes the steps of:

a1) using a Ti:Sapphire ultrafast laser to generate initial pulses of laser light having the duration of less than about 1 ps; and a2) tripling a frequency of the laser light in the initial pulses to generate the pulses of UV laser light, the peak wavelength of the pulses of UV laser light being in the range of 253 nm to 274 nm.

36. The method according to claim 10, wherein step (a) includes the steps of:

a1) using a Pr:YLF ultrafast laser to generate initial pulses of laser light having the duration of less than about 1 ps; and a2) tripling a frequency of the laser light in the initial pulses to generate the pulses of UV laser light, the peak wavelength of the pulses of UV laser light being approximately 204 nm.

37. The method according to claim 10, wherein step (a) includes the steps of:

a1) using a 4-dicyanmethylene-2-methyl-6(P-dimethylaminostyryl)-4H-pyran ultrafast dye laser to generate initial pulses of laser light having the duration of less than about 1 ps; and a2) tripling a frequency of the laser light in the initial pulses to generate the pulses of UV laser light, the peak wavelength of the pulses of UV laser light being in the range of 199 nm to 237 nm.

38. The method according to claim 10, wherein step (a) includes the steps of:

a1) using a benzoic Acid, 2-[6-ethylamino)-3-(ethylimino)-2,7-dimethyl-3H-xanthen-9-yl]-ethyl ester, monohydrochloride ultrafast dye laser to generate initial pulses of laser light having the duration of less than about 1 ps; and a2) tripling a frequency of the laser light in the initial pulses to generate the pulses of UV laser light, the peak wavelength of the pulses of UV laser light being in the range of 185 nm to 205 nm.

39. The method according to claim 10, wherein step (a) includes the steps of:

a1) using a 7-diethylamino-4-methylcoumarin ultrafast dye laser to generate initial pulses of laser light having the duration of less than about 1 ps; and a2) tripling a frequency of the laser light in the initial pulses to generate the pulses of UV laser light, the peak wavelength of the pulses of UV laser light being in he range of 145 nm to 167 nm.

40. The method according to claim 10, wherein step (a) includes the steps of:

a1) using a XeCl ultrafast excimer laser to generate initial pulses of laser light having the duration of less than about 1 ps; and a2) tripling a frequency of the laser light in the initial pulses to generate the pulses of UV laser light, the peak wavelength of the pulses of UV laser light being approximately 103 nm.

41. The method according to claim 10, wherein step (a) includes the steps of:

a1) using a Cr:YAG ultrafast laser to generate initial pulses of laser light having the duration of less than about 1 ps; and a2) quadrupling a frequency of the laser light in the initial pulses to generate the pulses of UV laser light, the peak wavelength of the pulses of UV laser light being approximately 380 nm.

42. The method according to claim 10, wherein step (a) includes the steps of:

a1) using a Cr:Forsterite ultrafast laser to generate initial pulses of laser light having the duration of less than about 1 ps; and a2) quadrupling a frequency of the laser light in the initial pulses to generate the pulses of UV laser light, the peak wavelength of the pulses of UV laser light being in the range of 307 nm to 318 nm.

43. The method according to claim 10, wherein step (a) includes the steps of:

a1) using a Nd:YAG, Nd;YVO$_4$, or Nd:GdVO4 ultrafast laser to generate initial pulses of laser light having the duration of less than about 1 ps; and a2) quadrupling a frequency of the laser light in the initial pulses to generate the pulses of UV laser light, the peak wavelength of the pulses of UV laser light being approximately 256 nm.

44. The method according to claim 10, wherein step (a) includes the steps of:

a1) using a Nd:glass ultrafast laser to generate initial pulses of laser light having the duration of less than about 1 ps; and a2) quadrupling a frequency of the laser light in the initial pulses to generate the pulses of UV laser light, the peak wavelength of the pulses of UV laser light being in the range of 262 nm to 272 nm.

45. The method according to claim 10, wherein step (a) includes the steps of:

a1) using a Nd:YLF ultrafast laser to generate initial pulses of laser light having the duration of less than about 1 ps; and a2) quadrupling a frequency of the laser light in the initial pulses to generate the pulses of UV laser light, the peak wavelength of the pulses of UV laser light being approximately 262 nm or approximately 263 nm.

46. The method according to claim 10, wherein step (a) includes the steps of:

a1) using a Yb:YAG ultrafast laser to generate initial pulses of laser light having the duration of less than about 1 ps; and a2) quadrupling a frequency of the laser light in the initial pulses to generate the pulses of UV laser light, the peak wavelength of the pulses of UV laser light being approximately 258 nm.

47. The method according to claim 10, wherein step (a) includes the steps of:

a1) using a Cr: LiSAF ultrafast laser to generate initial pulses of laser light having the duration of less than about 1 ps; and a2) quadrupling a frequency of the laser light in the initial pulses to generate the pulses of UV laser light, the peak wavelength of the pulses of UV laser light being in the range of 206 nm to 219 nm.

48. The method according to claim 10, wherein step (a) includes the steps of:

a1) using a 2-(6-(4-dimethylaminophenyl)-2,4-neopentylene-1,3,5-hexatrienyl)-3-methylbenzothiazolium perchlorate ultrafast dye laser to generate initial pulses of laser light having the duration of less than about 1 ps; and a2) quadrupling a frequency of the laser light in the initial pulses to generate the pulses of UV laser light, the peak wavelength of the pulses of UV laser light being in the range of 196 nm to 225 nm.

49. The method according to claim 10, wherein step (a) includes the steps of:

a1) using a Ti:Sapphire ultrafast laser to generate initial pulses of laser light having the duration of less than about 1 ps; and a2) quadrupling a frequency of the laser light in the initial pulses to generate the pulses of UV laser light, the peak wavelength of the pulses of UV laser light being in the range of 190 nm to 205 nm.

50. The method according to claim 10, wherein step (a) includes the steps of:

a1) using a Pr:YLF ultrafast laser to generate initial pulses of laser light having the duration of less than about 1 ps; and a2) quadrupling a frequency of the laser light in the initial pulses to generate approximately 153 nm.

51. The method according to claim 10, wherein step (a) includes the steps of:

a1) using a 4-dicyanmethylene-2-methyl6-(p-dimethylaminostyryl)-4H-pyran ultrafast dye laser to generate initial pulses of laser light having the duration of less than about 1 ps; and a2) quadrupling a frequency of the laser light in the initial pulses to generate the pulses of UV laser light, the peak wavelength of the pulses of UV laser light being in the range of 145 nm to 178 nm.

52. The method according to claim 10, wherein step (a) includes the steps of:
  a1) using a benzoic Acid, 2-[6-(ethylamino)-3-(ethylimino)-2,7-dimethyl;-3H-xanthen-9-Yl]-ethyl ester, monohydrochloride ultrafast dye laser to generate initial pulses of laser light having the duration of less than about 1 ps; and
  a2) quadrupling a frequency of the laser light in the initial pulses to generate the pulses of UV laser light, the peak wavelength of the pulses of UV laser light being en the range of 139 nm to 156 nm.

53. The method according to claim 10, wherein step (a) includes the steps of:
  a1) using a 7-diethylamino-4-methylcoumarin ultrafast dye laser to generate initial pulses of laser light having the duration of less than about 1 ps; and
  a2) quadrupling a frequency of the laser light in the initial pulses to generate the pulses of UV laser light, the peak wavelength of the pulses of UV laser light being in the range of 109 nm to 125 nm.

* * * * *